July 9, 1935. C. W. BRISTOL 2,007,912
MECHANISM FOR ADJUSTING THE SENSITIVITY OF CONTROL APPARATUS
Filed May 1, 1934
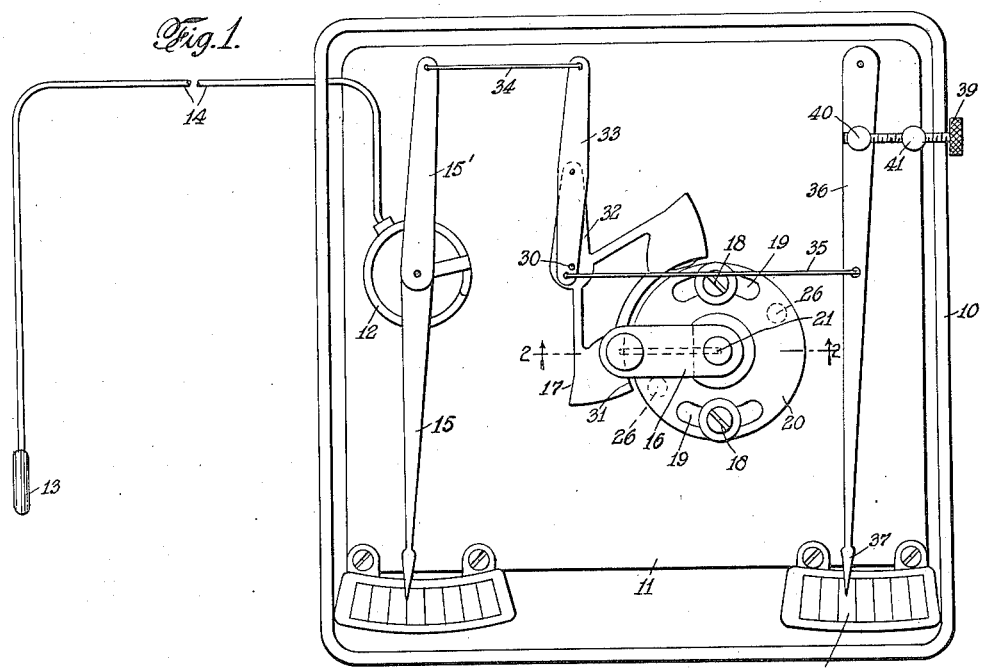
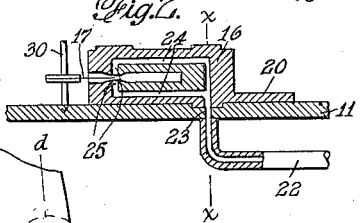
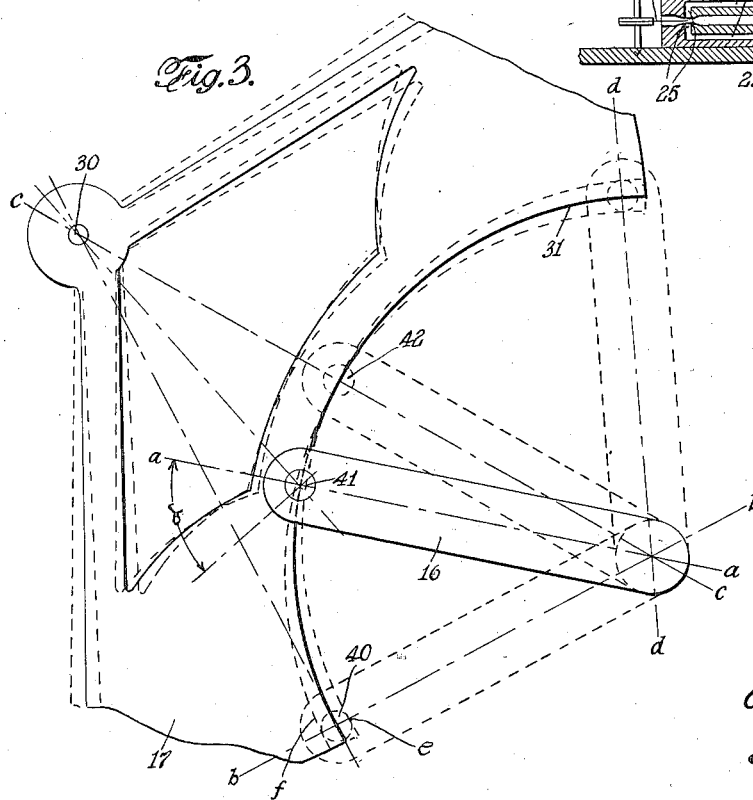
INVENTOR
CARLTON W. BRISTOL
BY
ATTORNEY Patented July 9, 1935

2,007,912

UNITED STATES PATENT OFFICE 2,007,912

MECHANISM FOR ADJUSTING THE SENSITIVITY OF CONTROL APPARATUS

Carlton W. Bristol, Naugatuck, Conn., assignor to The Bristol Company, Waterbury, Conn., a corporation of Connecticut Application May 1, 1934, Serial No. 723,328

13 Claims. (Cl. 236—85)

The invention relates to fluid-actuated control apparatus of the nature embodying a supply and waste type control member, for example, control means such as is set forth in U. S. Letters Patent #1,880,247.

In the automatic control of temperatures, pressures or other variable magnitudes by control members of the aforesaid nature, it has been found that, owing to the number of extraneous variables encountered, a variety of relationships is desirable between the action of a responsive member regulating the control member and said control member. Thus, a relationship between these members which, under one group of associated conditions, might effect a satisfactory control, might under other conditions bring about a degree of "sluggishness" or "hunting" sufficient to impair, and possibly defeat, the purpose of the automatic control system.

The invention has for an object the provision of a control couple embodying simple and effective mechanism for adjusting the sensitivity of said couple and whereby the aforementioned objectionable features may be eliminated.

Another object of the invention resides in the provision of means whereby the action of said control couple may be reversed without necessitating any structural alteration and with a minimum of manipulation.

In carrying out the invention, a control couple, of the general nature of that set forth in the aforesaid Patent #1,880,247, is arranged to have its normally stationary orifice element carried by means capable of being set in different locations to thereby variously dispose the orifices of the said stationary element with reference to its cooperating movable vane element.

The latter, furthermore, is provided with an edge such as to cut across the path of the fluid escaping from opposed orifices of the stationary element in different degrees and in accordance with the particular location of the means carrying the said orifice element of the couple. With different settings of this means, therefore, there may be obtained varying relationships between the action of the responsive element and that of the control couple of the system.

While this result may be attained in a number of different ways, it is preferred to utilize a control couple which is not exactly of the nature of that set forth in the aforesaid Letters Patent, wherein the orifice element is disclosed as being adjustable; but rather a control couple such as is set forth more particularly in a copending application for U. S. Letters Patent, Serial No. 687,328, filed August 29, 1933, jointly by me and Perry A. Borden. In this embodiment, the adjustment between the two elements of the control couple is effected by imparting a differential movement to the movable vane element of the couple.

Such arrangement greatly simplifies the carrying out of the present invention, as provision need not be made to accommodate for movement in two senses. The contour of the vane element is then made such as to assume various angles with its direction of travel; and the orifice element is arranged to be shifted to different locations in relation to the said vane, whereby a selected angle of approach may be utilized.

The nature of the invention, however, will best be understood when described in connection with the accompanying drawing, in which:

Fig. 1 is a plan view illustrating an instrument casing, with cover removed, and showing the retained novel mechanism.

Fig. 2 is a fragmentary vertical section through the nozzle element of the control couple and support therefor, taken on the line 2—2, Fig. 1.

Fig. 3 illustrates on an enlarged scale the geometrical arrangement and mode of adjustment for varying sensitivities in the action of the control couple.

Referring to the drawing, 10 designates an instrument casing for retaining the novel control mechanism which is designed to be mounted upon the back or base plate 11 of the casing. This mechanism comprises the usual Bourdon tube 12 which is adapted to respond, for example, to pressure changes of a volatile fluid in a bulb 13 located at some remote point and connected thereto by means of a capillary tube 14. The Bourdon tube, in response to the variations in pressure of the fluid in bulb 13 under changes in magnitude to which the bulb is exposed, is caused to deflect an index member 15 for indicating and/or recording, if desired, the condition, for example of the temperature, to which the bulb 13 is exposed—all of which is well understood and forms no particular part of the present invention.

There is also mounted on the plate 11 a control couple comprising an orifice element 16 and a vane element 17, the former having opposed jets for bleeding fluid from a fluid-controlled system (not shown) operated on the supply-and-waste principle through variation effected in the fluid bled through the orifices, and as is more particularly set forth in the said U. S. Letters Patent #1,880,247. The orifice element 16 is normally fixed in position relatively to the vane element 17, as by means of screws 18 adapted to fit into the base plate 11 and passing through slots 19 of a circular plate 20 which carries the said orifice element.

In accordance with the invention, the slots 19 are elongated and arcuate in order to admit of swinging plate 20, with the orifice element, about the center 21 or axis x—x of connection of the orifice element to a source of fluid under pressure as the pipe 22. A passage 23 to this end is brought through the base plate and circular plate mounted thereover and communicates with interior passageways 24 which in turn communicate with the separated and opposed nozzles 25 of the orifice element.

Provision is made, also, as by tapping the base plate at the positions 26, to admit of bodily shifting the nozzle element with its circular carrying plate to a different position for sensitivity variation, but in a reverse sense. Thus, by means of said screws 18, the circular plate 20 with its nozzle element may be clamped in any desired position, over a predetermined angle, and for cooperation with its vane element in a manner either to effect an increase or a decrease for a corresponding direction of movement of the vane.

The vane element 17, which cooperates with the jets from the orifice element 16 to constitute the control couple, is, in the present embodiment, fixed to a shaft or spindle 30 with which it may be rotated through a limited angle in a manner to obstruct, more or less, the escape of fluid through the nozzles 25. The contour of the engaging edge 31 of the said vane 17 is conformed to an arc of a circle having its center in the rotational axis x—x of the plate 20 when the said vane is in its neutral or optimum control position. The arcuate edge of the vane extends from a point slightly beyond that at which the tangent to the arc on one side of the median line c—c passes through the center of the spindle 30 to a similar point on the other side of the median line.

A lever arm 32, also affixed to the spindle 30, serves to carry the fulcrum of a floating lever 33, one extremity of which is operatively connected, by means of link 34, to an arm 15' extending oppositely to the index member 15 and integrally connected thereto and rotatable therewith under the influence of the Bourdon tube 13. The other extremity of the floating lever 33 is connected by means of link 35 to a movable arm 36 which carries an index 37 at its one end and adapted to indicate with reference to a scale 38. By means of an adjustment screw 39, pivoted to a swivel block 40 on the arm 36 and threaded through a block 41 swivelled on the base 11, the said arm 36 may be adjusted to and held at any desired point within the range of the instrument. This provides for a control point adjustment substantially identical with that disclosed in the aforesaid pending application Serial No. 687,328, and wherein the moving vane is caused automatically to seek an optimum position of control corresponding to the setting of the adjustable index.

With the circular plate and orifice element located by means of the screws 18 in the position shown in Fig. 1, the said orifice element may be adjusted to a position of maximum sensitivity— as along the axis b—b, Fig. 3—or to a position of minimum sensitivity—as along the axis c—c— merely by loosening the screws and suitably displacing the plate angularly. By resetting the plate 20 with the screws 18 located in the tapped openings 26, adjustment may be made through a similar range on the other side of the axis c—c over an angle to a position along the axis d—d. This adjustment, however, has the opposite effect, since a movement of the vane with respect to the orifice element thus located between the axes b—b and c—c and toward the latter would tends to cut off the flow from the nozzles, while a movement from a position between the axes c—c and d—d would tend to increase the flow from the said nozzles.

This is more clearly indicated in Fig. 3 of the drawing, in which the orifice element 16 is indicated in full lines at an intermediate position of the adjustment, as along the axis a—a; and the vane element 17 is also indicated in full lines at an intermediate position of its normal travel.

The extremes of the vane when controlling are indicated by dotted lines at the positions e and f, the range of movement under the influence of the responsive member 13 being such that with the orifice element located along the axis b—b in which position the edge of the vane is substantially perpendicular to its line of travel—that portion of the edge which coacts with the vane is at a maximum radius from its center of rotation located in the axis of rotation of spindle 30. The vane may therefore move from a position where the orifices are just completely covered thereby, position e, to a position where the orifices are substantially unobstructed, as at the position f.

If the orifice element, on the other hand, be positioned along the axis a—a, it will be noted that because of the obliquity of the portion of the edge of the vane now coacting with the orifices— as represented by the angle α—and also because of the reduced radius of travel at this portion (from spindle 30 to positions 40, 41 and 42, respectively), a movement of the vane through the same angle as in the previous instance will effect a much smaller proportionate change in the unobstructed area of the orifices.

If the orifice element be moved to the position along the axis c—c, as indicated by the dotted lines, in which the edge of the vane element is substantially parallel to its line of travel, movement of the vane through its entire range e, f, will produce substantially no change in the area of orifice opening. There is thus effected a change from maximum sensitivity, as along the axis b—b, to a zero or minimum sensitivity, as along the axis c—c.

A maximum sensitivity prevails also when the orifice element is positioned along the axis d—d, as by shifting the plate 20 as hereinbefore set forth, with a sensitivity gradually diminishing to a minimum as the orifice element is positioned toward a location along the axis c—c.

I claim:

1. In fluid-actuated controller apparatus: a control couple of the supply-and-waste type embodying a normally stationary orifice element and an oscillatable vane element cooperating therewith in response to an actuation and having a cut-off edge of varying angularity in respect to its direction of movement, and means to fixedly position the orifice element in different locations relative to said cut-off edge whereby the degree of cut-off of said edge relatively to the extent of said actuation may be varied in accordance with the position of the orifice element.

2. In fluid-actuated controller apparatus: a control couple of the supply-and-waste type embodying an angularly adjustable orifice element and an oscillatable vane element cooperating therewith in response to an actuation and having a cut-off edge conforming to an arc about the center of angular adjustment of the orifice element and adapted for cooperation with an orifice thereof, and means to fixedly locate the orifice element in different adjusted positions relatively to the said cut-off edge, whereby the degree of cut-off of said edge relatively to the extent of said actuation may be varied in accordance with the position of the orifice element.

3. In fluid actuated controller apparatus: a control couple of the supply-and-waste type embodying an angularly adjustable orifice element and a vane element oscillatable about a fixed center different from the center about which the orifice element is angularly adjustable, said vane having a cut-off edge conforming to an arc about the center of angular adjustment of the orifice element and adapted for cooperation with an orifice thereof, and means to fixedly locate the orifice element in different adjusted positions relatively to said cut-off edge, whereby the degree of cut-off of said edge relatively to the extent of actuation may be varied in accordance with the position of said orifice element.

4. In fluid-actuated controller apparatus: a control couple of the supply-and-waste type embodying a normally stationary orifice element and a cooperating vane element oscillatable in response to changes in magnitude of the condition controlled by said apparatus and having a cut-off edge of varying angularity in respect to its direction of movement, means to fixedly position the orifice element in different locations relative to a cut-off edge of the vane element whereby the extent of cut-off by said edge may be varied in accordance with the position of the orifice element, and means to displace the vane element about its center of oscillation.

5. In fluid-actuated controller apparatus: a control couple of the supply-and-waste type embodying a normally stationary orifice element and a cooperating vane element oscillatable in response to changes in magnitude of the condition controlled by said apparatus, means to fixedly position the orifice element in different locations relative to a cut-off edge of the vane element whereby the extent of cut-off by said edge may be varied in accordance with the position of the orifice element, and differential-lever means to displace the vane element about its center of oscillation.

6. In fluid-actuated controller apparatus: a control couple of the supply-and-waste type embodying a normally stationary orifice element provided with an orifice and a cooperating vane element oscillatable in response to changes in magnitude of the condition controlled by said apparatus, and means to adjust the obliquity of travel of an edge of the vane element relatively to the orifice of the orifice element.

7. In fluid-actuated controller apparatus: a control couple of the supply-and-waste type embodying a normally stationary and angularly movable orifice element and an oscillatable cooperating vane element having a cut-off edge conforming to an arc about the center of angular movement of the orifice element, and means to adjust the radius at which the edge of said vane element coacts with an orifice of the said orifice element.

8. In fluid-actuated controller apparatus: a control couple of the supply-and-waste type embodying a normally stationary and angularly movable orifice element and an oscillatable cooperating vane element having a cut-off edge conforming to an arc about the center of angular movement of the orifice element, and means to adjust the radius and angle at which the edge of said vane element coacts with an orifice of the said orifice element.

9. In fluid-actuated controller apparatus: a control couple of the supply-and-waste type embodying a normally stationary and angularly movable orifice element and an oscillatable cooperating vane element having a cut-off edge conforming to an arc about the center of angular movement of the orifice element, and means to adjust simultaneously the radius and angle at which the edge of said vane element coacts with an orifice of the said orifice element.

10. In fluid-actuated controller apparatus: a control couple of the supply-and-waste type embodying a normally stationary orifice element and a cooperating vane element oscillatable in response to changes in magnitude of the condition controlled by said apparatus, and means to secure the orifice element in two discrete operative locations relatively to the edge of its cooperating vane element, said means admitting also of positioning within predetermined limits the said orifice element in either of its discrete operative locations, the cutting-off action of the vane element in one location being the reverse of that in the other location.

11. In fluid-actuated controller apparatus: a control couple of the supply-and-waste type embodying a normally stationary orifice element and a cooperating vane element oscillatable in response to changes in magnitude of the condition controlled by said apparatus, a slotted carrying disk for the orifice element, and clamping means passing through the slot of said disk for fixing the same in a selected position.

12. In fluid-actuated controller apparatus: a control couple of the supply-and-waste type embodying a normally stationary orifice element and a cooperating vane element oscillatable in response to changes in magnitude of the condition controlled by said apparatus, a support for the couple, a carrying disk for the orifice element having an arcuate slot, and a screw passing therethrough for fixedly clamping to said support the carrying disk in any selected position within the limits of said slot.

13. In fluid-actuated controller apparatus: a control couple of the supply-and-waste type embodying a normally stationary orifice element and a cooperating vane element oscillatable in response to changes in magnitude of the condition controlled by said apparatus, a support for the couple, having pairs of tapped openings, an angularly movable carrying disk for the orifice element having a pair of arcuate slots for juxtaposition with respect to the tapped openings, screws fitting through the slots and adapted to fit a set of tapped openings for clamping the orifice element to the support, and the said sets of openings being angularly displaced and with reference to the center of said carrying disk at substantially equal radii.

CARLTON W. BRISTOL.